United States Patent Office

3,057,734
Patented Oct. 9, 1962

3,057,734
PROCESS FOR MAKING TABLE SYRUP AND PRODUCT THEREOF
Morton Pader, West Englewood, N.J., assignor to Lever Brothers Company, New York, N.Y., a corporation of Maine
No Drawing. Filed June 16, 1961, Ser. No. 117,511
28 Claims. (Cl. 99—142)

This invention relates to a food product and, more particularly, to a stable flavored aqueous emulsion having enhanced flavor characteristics.

Food products which are fat-in-water emulsions are well known. These include emulsified salad dressings, various dairy products, etc. The advantages which accrue from the emulsification of fats in table syrups having a large proportion of sugars, however, has not been fully realized.

The emulsions of the present invention are pourable products having a pleasant taste in which the flavor components are readily discernible and find use as syrups, dessert toppings, etc. Despite having a high sugar content, the emulsions do not deposit sugar crystals and are stable under a wide variety of storage conditions.

The compositions of the invention comprise a pourable flavored oil-in-water emulsion containing sugar in an amount of at least 65% of the aqueous phase; about 1–40% fat, some or all of which may be provided by butter; and about 0.1% to about 5% of an additive selected from the group consisting of water-dispersible proteins, gum arabic, and edible algin derivatives. The pleasant-tasting flavoring ingredient may be honey, maple syrup, fruit syrups, etc.

The sugar component of the aqueous phase may comprise any edible, water-soluble sugar such as dextrose, fructose, sucrose or maltose. Mixtures of suitable sugars may also be employed. To obtain a product exhibiting bacteriological stability, the total sugar concentration of the aqueous phase must be at least about 65%. If a translucent product is desired, an aqueous phase must be provided whose index of refraction approximately equals that of the fat component. To retard or inhibit the sugar crystallization which would normally occur at this high concentration, it is necessary that about 5–50% by weight of the composition comprise a partially hydrolyzed starch such as corn syrup.

When the additive comprises a protein, it is preferred to avoid the use of excessive amounts of reducing sugars in order to minimize or prevent any side reaction between the sugar and the protein. This same precaution must be observed when relatively large amounts of corn syrup are to be utilized. It is to be realized, of course, that means well known to those skilled in the art may be used to inhibit or retard reactions between any protein components present in the emulsion and the reducing sugars.

As the partially hydrolyzed starch constituent, it is preferred to utilize corn syrup having a dextrose equivalent of from about 24 to about 60. The amount to be added within the 5–50% range set forth above is necessarily limited by the desired viscosity of the composition since by increasing the amount of corn syrup, the viscosity of the composition is also increased unless the value of the dextrose equivalent is also increased. Corn syrups having the higher dextrose equivalents are less viscous than those starch products having lower dextrose equivalents.

It has been unexpectedly found that the presence of as little as about 1% fat in the emulsion substantially enhances and/or modifies the flavor characteristics of the composition and produces pronounced flavor sensations from the flavoring ingredient. The fat component is present in amounts of between 1–40% by weight of the emulsion, some or all of which may be provided by butter. The use of butter is particularly desirable since an emulsion is obtained which not only has a desirable flavor from the flavoring ingredient, but also may have a pronounced flavor sensation attributable to the butter. To provide translucency in the emulsion if such is desired, the refractive indices of the water and oil phases must be matched. To obtain a proper refractive index and therefore, a translucent product, combinations of triglycerides containing a relatively large proportion of short-chain fatty acids (e.g., coconut oil, butter oil, palm kernel oil) and triglycerides containing relatively long-chain unsaturated fatty acids (e.g., winterized cottonseed oil, corn oil) can be used. The former have a relatively low refractive index, the latter a high one.

The presence of fats containing a predominance of saturated long-chain fatty acids is deleterious to emulsion stability, and hydrogenated fats cannot be utilized in place of coconut oil or palm kernel oil to lower the refractive index of the fat phase. For optimum stability, the fat should either be all liquid at storage temperatures or contain a relatively high level of short-chain fatty acid residues. Where mixed triglycerides are to be used, the unsaturated glyceride oil and the saturated short-chain oil must be present in a ratio of at least about 1.5:1, respectively, or even higher. If these conditions are not observed, the emulsion breaks when alternately cooled and warmed. When the total fat level is not too high, a stable emulsion can be obtained using butter oil alone.

In order to enhance fat stability of the emulsion, it is desirable to pack the product under conditions whereby oxygen is excluded such as under a partial vacuum or in an inert atmosphere.

The presence of heavy metals increases the rate of deterioration of the fat in the emulsion, particularly in the presence of light. It is therefore desirable to include about 0.1–0.5% of an edible sequestrant in the composition. Among those agents which can be used are citric acid, malic acid, gluconic acid and ethylene diamine tetra-acetic acid, the last named compound being particularly effective. The salts of these acids may also be used in the emulsions. These sequestrants are effective in minimizing the development of any fatty off-flavors during storage of the syrup, particularly where the emulsion contains a relatively high level of fat. It is advantageous to pack the product in a light-proof container such as an amber bottle.

The emulsifier-stabilizer additive used in the preparation of the emulsion is of the utmost importance in obtaining stable products. This component comprises at least one member selected from the group consisting of water-dispersible proteins, gum arabic, and edible algin derivatives. For maximum emulsion stability, the polyhydric alcohol esters of alginic acid have proved to be the most satisfactory agents. These alginates and a method of preparing them are disclosed in U.S. Patent No. 2,426,125. They may be added to the composition in amounts of about 0.2–0.5% by weight. Several commercially available varieties of propylene glycol alginates are capable of stabilizing the emulsions including "Kelcoloid HV," "Kelcoloid LV" and "Kelcoloid O" sold by the Kelco Company of San Diego, California. The last named material is preferred since it yields satsfactory emulsions having a relatively low viscosity.

Other emulsifying and stabilizing agents which proved to be satisfactory include gelatin, casein and its derivatives including the caseinates, gum arabic, and mixtures of the foregoing. These aforementioned stabilizing agents are unique in their ability to stabilize a fat-in-sugar syrup emulsion according to the present invention. Such conventional emulsifiers as the "Spans" and "Tweens" and other fatty acid-based oil-in-water emulsifiers failed to stabilze these novel syrup emulsions although effective in stabilizing conventional emulsions of the oil-in-water type. Gums other than gum arabic were also found to be ineffective as stabilizers for the fat-in-sugar syrup emulsions. Gum arabic may be added in amounts of about 0.1–0.5%, casein and its derivatives in amounts of about 1–5% and gelatin in amounts of about 0.2–1% by weight. When the alginate esters are utilized as the stabilizers, they are preferably present in an acid pH. The proteins can be utilized at any pH where they are water-dispersible, but they are preferably used at the minimum pH compatible with their stabilizing effectiveness to minimize protein-sugar interactions, e.g., of the browning type. By increasing the proportions of stabilizer in the composition, the viscosity of the emulsion is correspondingly increased. Thus, the stabilizer becomes a means whereby the viscosity of the composition can be easily regulated.

It can be seen therefore, that at least two other means are available for regulating the viscosity of the emulsion, i.e., by regulating the amount of fat and the amount of stabilizer. Larger amounts of these ingredients result in more viscous compositions. Generally speaking, the most desirable viscosities are in the range below 3000 centipoises although suitable products can be prepared in which the viscosity is above this value.

Inhibitors which are well known in the art such as the benzoates and sorbic acid may be added to the composition. Refiner's syrup, molasses and other incompletely refined sugar products may comprise part of the sugar component of the emulsion. These ingredients contribute to the overall flavor of the product. Conventional edible coloring agents can also be added to the composition.

Any flavoring ingredient contributing a pleasant taste can be added to the compositions of this invention. The flavoring material preferably comprises a fresh fruit syrup, a crushed fresh or frozen fruit, honey or maple syrup. It is to be realized of course, that canned fruit may also be used in the compositions of this invention, as well as artificial flavors or fresh flavor concentrates although the fresh fruits are preferred. When fruit syrups are employed, appropriate adjustment in the other sugar components must be made so that the total sugar content of the aqueous phase will be about 65%.

A particularly attractive product is obtained when maple syrup (with or without added maple flavor) and butter oil (which can be added as butter) are used as components of the aqueous and fat phases, respectively. This product can be used on waffles and pancakes in the same manner as maple syrup and butter are customarily used on these foods. The amount of maple syrup that is advantageously used is limited by the fat content. If about 15% highly flavored maple syrup is incorporated in a high fat emulsion, the resultant emulsion tends to have an unappetizing, olive-drab color and an unbalanced maple flavor. More than 20% maple syrup can be used, however, when the fat level is relatively low. Obviously the limits on maple syrup and fat that provide acceptable products can be readily determined, and a level of maple syrup incorporated which does not produce a flavor or color defect. Surprisingly, as little as 2% butter has a pronounced effect on the flavor of the syrup, and is especially apparent when the syrup is hot, as when used on pancakes or waffles. The butter or fat does not, in all instances, simply yield a combination flavor. In many instances (markedly in the case of maple and butter combinations), it results in a flavor sensation different from that obtained by simple mixing of the fat and aqueous components. It is hypothesized that the intimate blending of fat and aqueous phases by homogenization results in extraction into the fat of flavor bodies originally present in the aqueous phase (for example, flavor bodies from maple syrup or maple flavor) and consequent modification of the flavor sensation in the mouth.

It is essential for maximum stability of the product that the emulsion be thoroughly homogenized. This can best be performed by passing the emulsion in separate stages through a homogenizer. If desired, the emulsion may be passed through a colloid mill prior to homogenization. Other means well known to those in the art can be utilized to prepare a completely homogenized emulsion.

The following examples in which proportions are given by weight is illustrative of the invention.

*Example 1*

A 400-lb batch of syrup was prepared according to the following formula:

| | Percent |
|---|---|
| Sugar, granulated | 53.74 |
| Corn syrup, 42 D.E | 14.00 |
| Salt | 0.10 |
| Citric acid, monohydrate | 0.10 |
| Propylene glycol ester of alginic acid | 0.20 |
| Maple syrup, strongly heated | 2.00 |
| Maple flavor | 0.10 |
| Butter | 2.00 |
| Color | 0.20 |

3 N NaOH, as required.
Water, to 100%.

The alginate ester was mixed with 15 lbs. of sugar for 15 minutes in a Hobart mixer.

In a covered steam-jacketed tank the citric acid was dissolved in almost all the water. The 3 N NaOH (700 ml.) was added to adjust the pH to 5.5 and the remaining water was then added. The solution was heated to 160° F. and the alginate-sugar mixture was added while stirring. The mixture was agitated gently for 10 minutes at 180° F. before the corn syrup, salt, sugar, and maple syrup were dissolved therein. The batch was reheated to 160° F., agitated, and held overnight to permit deaeration. Surface foam was removed and the refractive index (butyrorefractometer) measured at 77° F. The reading was 58.0. The butyrorefractometer reading at 77° F. of the fat in a sample of the butter was 53.8. Four liters of water were added to the aqueous solution to lower its reading to about 53.5. The solution was then heated to about 170° F. The butter was added, the mixture mixed and cycled through a colloid mill, the maple flavor added, and the mixture pumped to a Manton-Gaulin homogenizer, wherein it was homogenized at 3000 p.s.i.g. first stage, 500 p.s.i.g. second stage. The homogenized material was then pumped to a jacketed tank where it was maintained at 170–180° F. as it was filled into bottles. The filled bottles were capped and cooled rapidly with cold water.

Modifications of this process were equally effective in yielding a high quality product. For example, it was possible to replace part or all of the sugar with the so-called liquid sugar now marketed, making appropriate adjustments in the amount of water added. In this case, the algin derivative could be dispersed in the liquid sugar by distributing it on the surface thereof in such a manner as to avoid lumping and dispersing it thoroughly by stirring while applying heat. This avoided the deaeration operation.

*Example 2*

| | Percent |
|---|---|
| Liquid sucrose (67° Brix) | 68.0 |
| Honey | 10.0 |
| "Kelcoloid O" | 0.4 |
| Sugar, granulated | 12.74 |
| Citric acid | 0.1 |
| Salt | 0.1 |

Approximately 150 lbs. of a honey-butter syrup were prepared according to the following formula:

| | |
|---|---|
| Color | 0.01 |

Butter _____ 2.0
10% aqueous NaOH, as needed.
10% aqueous citric acid, as needed.
Water, to 100%.

The citric acid and salt were dissolved in 6.11 lbs. of water at 140° F. The pH was raised to 5.3 with 205 ml. NaOH solution, and the solution heated to 158° F. The "Kelcoloid O," preblended with 2.74 lbs. granulated sugar and the coloring material, was added. The temperature was raised to 167° F. and the mixture stirred 10 minutes; the "Kelcoloid O" was dispersed thoroughly thereby. The remaining granulated sugar was then added and dissolved with agitation. This solution was then added to the liquid sucrose in a separate tank, followed by the honey, which had been preheated to 113° F. After agitating for 30 minutes, the pH was adjusted from 5.15 to 5.10 by the addition of 15 ml. 10% aqueous citric acid.

The butryrorefractometer reading of the solution was 53.5 (77° F.). It was lowered to 50.2 by the addition of 375 ml. water. A sample of oil from the butter read 50.5.

The butter was melted and added to the aqueous phase. After mixing 15 minutes, the product was passed through a colloid mill with emulsifying rotor and stator and then through a tube heat exchanger, exit temperature of the liquid being 180° F. The product was homogenized in a Manton-Gaulin homogenizer, 3000 p.s.i.g. first stage, 500 p.s.i.g. second stage, filled into bottles, capped, and cooled with cold water.

Despite the low amounts of honey and butter, the product gave a pronounced flavor sensation of each.

Example 3

Frozen strawberries, containing added sugar, were thawed and disintegrated in a Waring Blendor. The seeds were removed by filtration through cloth. A strawberry-butter syrup was prepared on a laboratory scale essentially in accordance with Example 1, replacing maple materials with 20% of the strawberry filtrate, compensating approximately for sugar and water, and elevating the emulsifier level to 0.35%. A novel strawberry-butter flavor was obtained, with strong flavor contributions from both. To some of this material, the strawberry seeds obtained from the strawberries were added. The product had an attractive appearance, and was an excellent topping for ice cream, pancakes, etc.

Example 4

A batch of translucent syrup containing 20% fat was prepared according to the following formula:

| | Percent |
|---|---|
| Sugar | 40.90 |
| Corn syrup, 42 D.E. (80% solids) | 12.75 |
| Sodium caseinate | 1.89 |
| 3 N NaOH | 0.02 |
| Maple sugar | 1.93 |
| Maple flavor | 0.39 |
| Corn oil | 11.77 |
| Coconut oil | 7.70 |
| Butter flavor | 0.35 |
| Color (β-carotene in oil) | 0.20 |
| Water, to 100%. | |

The water-soluble ingredients were dissolved in the water at 140° F. and deaerated by gravity settling. The butyrorefractometer reading of the solution was then determined at 73° F. and adjusted to 60.0 by adding water since it was too high. The aqueous phase (4000 g.) and the fat phase (1000 g.) were stirred together 15 minutes at 176° F., avoiding incorporation of air. The mixture was homogenized at 176° F. and held in a separatory funnel about 5 minutes to permit deaeration. The product was then filled into bottles and cooled 20 minutes in cold running tap water.

This emulsion was translucent and was stable for more than a month at room temperature, and more than 12 days at 130° F. It had a milk-like flavor superimposed on a butter-maple flavor. The flavor, however, changed during storage much faster than that of the product in Example 1, which had a very stable flavor.

Lowering the sodium caseinate level to 1% did not appreciably affect emulsion stability. Substituting winterized cottonseed oil for the corn oil-coconut oil made the emulsion less translucent (more cloudy). Substituting hydrogenated cottonseed oil for the coconut oil (same refractive index) resulted in an unstable emulsion.

Example 5

A product was made as in Example 4, but 0.25% gelatin (275 Bloom rating) was substituted for the sodium caseinate. A stable, translucent emulsion was obtained, with good flavor. Elevation of the gelatin level to 0.5% resulted in a much more viscous emulsion. Low gel-strength gelatins, i.e., 50–100 Bloom ratings, failed to yield stable emulsions except when amounts conducive to gelation of the syrup were employed.

Example 6

A series of tests was conducted using formulations such as in Example 1, but employing different "Kelcoloid" preparations and fat levels to determine the effect of these factors on emulsion viscosity. In all tests, the fat was blended so as to obtain a translucent emulsion. The results were as follows:

"Kelcoloid"

| Fat Content, Percent | Type | Concentration, Percent | Viscosity,[1] c.p.s. | Temperature, ° F. |
|---|---|---|---|---|
| 20 | LV | 0.25 | 7,800 | 75 |
| 20 | O | 0.25 | 3,350 | 75 |
| 15 | O | 0.25 | 2,400 | 75 |
| 10 | O | 0.25 | 1,720 | 75 |
| 10 | O | 0.25 | 1,700 | 80 |
| 5 | O | 0.25 | 1,100 | 80 |
| [3]2 | O | 0.25 | 700 | 80 |
| [3]2 | O | 0.20 | 545 | 80 |
| [3]2 | O | [2]0.10 | | |

[1] Brookfield viscometer, No. 3 spindle, 6 r.p.m.
[2] Emulsion showed poor stability.
[3] 1.8% butter oil+0.2% cottonseed salad oil.

Example 7

The relation between homogenization and emulsion stability was demonstrated in a series of tests.

A formulation was prepared consisting of aqueous and fat phases with the following compositions.

| Aqueous phase: | Grams |
|---|---|
| Sucrose | 10,200 |
| Corn syrup | 5,500 |
| "Kelcoloid LV" | 70 |
| Maple syrup | 550 |
| Maple flavor | 5,775 |
| Water | 5,775 |

| Fat phase: | Grams |
|---|---|
| Winterized cottonseed oil | 3,380 |
| Coconut oil | 1,005 |
| Butter | 500 |
| Butter flavor | 88 |
| Color solution (β-carotene in oil) | 50 |

The aqueous phase (4000 grams) and the fat phase (1000 grams) were mixed at 140° F. and homogenized under various conditions. The emulsion stability was estimated by observing time at 130° F. and time on centrifuging required to break the emulsion.

The results were as follows:

| Homogenization Conditions[1] Pressure (p.s.i.g.) | | Number of Passes through Homogenizer | Stability at 130° F. (days) | Separation of a serum layer after centrifugation 2 hours at 1,500 r.p.m. (10½" diameter) |
|---|---|---|---|---|
| 1st Stage | 2nd Stage | | | |
| 5,000 | 300 | 1 | More than 14 | Very slight. |
| 5,000 | 300 | 3 | do | None. |
| 3,000 | 300 | 1 | 12 | Slight. |
| 3,000 | 300 | 3 | More than 13[2] | None. |
| 500 | 100 | 1 | 4 | Marked. |
| 500 | 100 | 3 | More than 6[2] | Slight. |

[1] Manton-Gaulin homogenizer.
[2] Slight fatty layer observed on surface.

These tests indicated the dependence of emulsion stability on homogenization conditions.

The term "sugar" as used in the present specification and claims is not to be limited to sucrose only but is intended to encompass the use of non-sucrose materials including dextrose, corn syrup materials, etc.

It will be appreciated that various modifications and variations may be made in the process and products of the present invention without departing from the spirit thereof and, accordingly, the product and process are to be limited only within the scope of the appended claims.

I claim:

1. A table syrup in the form of a stable, pourable, translucent, oil-in-water emulsion containing a pleasant-tasting flavoring ingredient, at least about 65% sugar in the aqueous phase, about 1–40% by weight of fat based on the total weight of the composition and an additive selected from the group consisting of water-dispersible proteins, gum arabic and edible algin derivatives, said additive being present in an amount sufficient to stabilize the emulsion against separation of the oil and water phases but insufficient to render the emulsion unpourable, and the refractive indices of the oil and water phases of the emulsion being approximately the same.

2. The product of claim 1 containing sucrose and a partially hydrolyzed starch, the latter being present in the amount of about 5–50% by weight of the composition.

3. The product of claim 2 wherein the partially hydrolyzed starch is corn syrup having a dextrose equivalent in the range of about 24–60.

4. The product of claim 1 wherein the additive comprises a polyhydric alcohol ester of alginic acid.

5. The product of claim 1 wherein the fat component contains butter oil.

6. The product of claim 1 containing an edible sequestering agent in an amount sufficient to retard the development of fatty off-flavors during storage of the syrup.

7. The product of claim 1 wherein the pleasant-tasting flavoring ingredient is selected from the syrup consisting of maple flavored ingredients, honey flavored ingredients, and fruit flavored ingredients.

8. The product of claim 7 wherein the flavoring ingredient is honey.

9. The product of claim 7 wherein the flavoring ingredient is a fruit syrup.

10. The product of claim 7 wherein the flavoring ingredient is a crushed fruit.

11. The product of claim 7 wherein the flavoring ingredient is maple syrup.

12. A table syrup in the form of a stable, pourable, flavored oil-in-water emulsion comprising:
   (a) from about 1% to about 20% by weight of the total composition of fat, the fat including butter oil,
   (b) up to about 20% by weight of the total composition of maple syrup,
   (c) about 5–50% by weight of the total composition of a partially hydrolyzed starch, and
   (d) an additive selected from the group consisting of water-dispersible proteins, gum arabic and edible algin derivatives,
the aqueous phase having at least about 65% sugar including sucrose therein, based on the weight of the aqueous phase, and wherein the maple syrup and fat are present in a ratio such that the syrup is free from color and flavor defects, said additive being present in an amount sufficient to stabilize the emulsion against separation of the oil and water phases but insufficient to render the emulsion unpourable.

13. The product of claim 12 wherein the additive comprises a polyhydric alcohol ester of alginic acid.

14. The product of claim 12 wherein the fat component is butter.

15. A translucent table syrup in the form of a stable, pourable, flavored oil-in-water emulsion comprising:
   (a) a pleasant tasting flavoring ingredient,
   (b) from about 1% to about 20% by weight of the total composition of fat,
   (c) about 5–50% by weight of the total composition of corn syrup, and
   (d) an edible algin derivative,
the refractive indices of the aqueous and fat phases of the emulsion being approximately the same and the aqueous phase having at least about 65% sugar including sucrose therein, based on the weight of the aqueous phase, said derivative being present in an amount sufficient to stabilize the emulsion against separation of the oil and water phases but insufficient to render the emulsion unpourable.

16. The product of claim 15 wherein the flavoring ingredient is selected from the group consisting of maple flavored ingredients, honey flavored ingredients, and fruit flavored ingredients.

17. The product of claim 15 wherein the fat phase contains butter oil and the aqueous phase contains a maple flavoring agent.

18. The product of claim 17 wherein the butter oil is added to the fat phase as butter.

19. A table syrup in the form of a stable, pourable, flavored oil-in-water emulsion comprising:
   (a) from about 1% to about 20% by weight of the total composition of fat, the fat including butter oil,
   (b) up to about 20% by weight of the total composition of maple syrup,
   (c) about 5–50% by weight of the total composition of corn syrup having a dextrose equivalent in the range of about 24–60, and
   (d) about 0.2–0.5% by weight of the composition of a propylene glycol ester of alginic acid,
the aqueous phase having at least about 65% sugar including sucrose therein, based on the weight of the aqueous phase, and wherein the maple syrup and fat are present in a ratio such that the syrup is free from color and flavor defects, the refractive indices of the oil and water phases of the emulsion being approximately the same.

20. The product according to claim 19 wherein the composition also contains a maple flavoring ingredient and an edible sequestering agent in an amount sufficient to retard the development of fatty off-flavors during storage of the syrup.

21. A method of preparing a table syrup in the form of a stable, pourable, translucent, flavored oil-in-water emulsion which comprises:
   (a) forming an aqueous mixture containing (1) a pleasant tasting flavoring ingredient, (2) at least about 65% sugar, and (3) an additive selected from the group consisting of water-dispersible proteins, gum arabic, and edible algin derivatives;
   (b) blending said aqueous mixture with about 1–40% fat; and
   (c) homogenizing the blend of said aqueous mixture with said fat;
the amount of sugar being based on the weight of the aqueous mixture, the amount of fat being based on the weight of the total composition, the additive being present in an amount sufficient to stabilize the emulsion against separation of the oil and water phases but insufficient to render the emulsion unpourable, and the refractive indices of the oil and water phases of the emulsion being approximately the same.

22. The method of claim 21 in which the additive comprises a polyhydric alcohol ester of alginic acid.

23. The method of claim 21 wherein the aqueous phase contains a partially hydrolyzed starch.

24. The method of claim 21 wherein the mixture contains an edible sequestering agent in an amount sufficient to retard the development of fatty off-flavors during storage of the syrup.

25. The method of claim 21 wherein the flavoring ingredient is selected from the group consisting of maple flavored ingredients, honey flavored ingredients, and fruit flavored ingredients.

26. A table syrup in the form of a stable, pourable, oil-in-water emulsion comprising:
   (a) from 1–20% by weight of the total composition of a fat including butter;
   (b) up to about 20% by weight of the total composition of maple syrup; and
   (c) a propylene glycol ester of alginic acid in an amount sufficient to stabilize the emulsion against separation of the oil and water phases but insufficient to render the emulsion unpourable;
the aqueous phase of the emulsion having at least about 65% sugar including sucrose therein based on the weight of the aqueous phase, and wherein the maple syrup and fat are present in a ratio such that the syrup is free from color and flavor defects.

27. The table syrup of claim 26, wherein the refractive indices of the oil and water phases of the emulsion are approximately the same.

28. A table syrup in the form of a stable, pourable, translucent, oil-in-water emulsion comprising about 2% by weight of the total composition of butter, about 2% by weight of the total composition of maple syrup, about 0.2–0.5% by weight of the total composition of a propylene glycol ester of alginic acid and an edible sequestering agent in an amount sufficient to retard the development of fatty off-flavors during storage of the syrup, the aqueous phase of the emulsion having at least about 65% by weight of sugar including sucrose therein.

References Cited in the file of this patent

UNITED STATES PATENTS

| | | |
|---|---|---|
| 2,455,820 | Steiner | Dec. 7, 1948 |
| 2,694,643 | Robinson et al. | Nov. 16, 1954 |
| 2,700,612 | Chenicek | Jan. 25, 1955 |
| 2,786,765 | Prince | Mar. 26, 1957 |
| 3,010,830 | Berndt | Nov. 28, 1961 |

OTHER REFERENCES

Excerpts from "Gelatin," distributed by Atlantic Gelatin Division of General Foods Corporation.

Whitmore et al.: Industrial and Engineering Chemistry, vol. 21, No. 9, September 1929, pages 878–880.

Tice: "Gelatin as an Emulsifier," American Professional Pharmacist, vol. 11, No. 1, April 1936.

Tice: "Gelatin as an Emulsifying Agent," the Drug and Cosmetic Industry, May 1936.

Steiner et al.: "Organic Derivatives of Alginic Acid," Industrial and Engineering Chemistry, vol. 43, No. 9, September 1951, pages 2073 to 2077.

Leon: "An Encyclopedia of Candy and Ice-Cream Making," 1959, Chemical Publishing Co., Inc., New York, pages 101 and 102.

UNITED STATES PATENT OFFICE

CERTIFICATE OF CORRECTION

Patent No. 3,057,734                          October 9, 1962

Morton Pader

It is hereby certified that error appears in the above numbered patent requiring correction and that the said Letters Patent should read as corrected below.

Column 3, line 3, for "stabilze" read -- stabilize --; column 4, lines 73 and 74, strike out "Approximately 150 lbs. of a honey-butter syrup were prepared according to the following formula:" and insert the same after "Example 2" in line 65, same column 4; column 5, line 19, for "butryrorefractometer" read -- butyrorefractometer --; column 6, line 61, for "5,775" read -- 122 --; column 7, line 56, for "syrup" read -- group --.

Signed and sealed this 19th day of February 1963.

(SEAL)
Attest:

ESTON G. JOHNSON                               DAVID L. LADD
Attesting Officer                                    Commissioner of Patents